Dec. 2, 1952     W. SCHAUFELBERGER     2,619,719

CUTTER HEAD FOR DRY SHAVERS

Filed June 24, 1949

INVENTOR:
Willy Schaufelberger
by Sommers & Young
Attorneys

Patented Dec. 2, 1952

2,619,719

UNITED STATES PATENT OFFICE 2,619,719

CUTTER HEAD FOR DRY SHAVERS

Willy Schaufelberger, Zurich, Switzerland

Application June 24, 1949, Serial No. 101,109
In Switzerland August 4, 1948

2 Claims. (Cl. 30—43)

This invention relates to cutter heads for dry-shaving apparatus, in which the portion of the cutter which is intended to slide on the skin, is apertured or slotted to permit the hairs to project so that they may be cut off.

In the accompanying drawing illustrating the invention

First the conditions prevailing when shaving by means of the said cutter portions, will be explained herein with the aid of Figs. 1–4 of the accompanying drawing. That portion of the rigid cutter portion $b$ which slides on the skin $a$, customarily is provided with apertures $c$ of square, rectangular or circular shape. The hairs $e$ enter through the apertures $c$ and are cut off by knives $f$ which slide past the said apertures underneath the same. The depth of penetration of the skin into the apertures depends on the dimensions of the latter. The circular apertures conventionally have a diameter of approximately 0.5 millimeter. The thickness D of the cutter-head portions which slide on the skin and which comprise the said apertures, customarily is approximately 0.05 to 0.1 millimeter.

Tests have shown that the depth E of penetration of the skin into the apertures is a function of the dimensions of the latter. A rectangular aperture of 0.5 by 1 millimeter allows the skin to enter, at the most, approximately 1.23 times as far as a rectangular aperture of 0.5 by 0.5 mm. or a circular aperture of 0.5 mm. diameter. When choosing the greater dimension of the rectangle approximately four times its width, for example 0.5 mm. by 2 mm., the maximum depth E of penetration of the skin will be approximately twice as great as for a square aperture of 0.5 by 0.5 mm. Upon further lengthening of the aperture, for example to a size of 0.5 by 3 mm., the depth of penetration of the skin will remain practically constant. Also, it is not important whether the corners of the rectangle are rounded or radiused or not. In order to prevent the skin from being injured the depth of penetration should not be greater than the thickness D of the cutter-head portion $b$ which slides on the skin and on the underside of which the cutter knives slide.

Circular apertures are best suited for shaving relatively short hairs, since the latter project substantially at right angles to the skin surface. In the case of circular or square apertures which have no greater dimensions than possible on account of the depth of penetration of the skin, the shaving of longer hairs presents difficulties, since such hairs mostly are inclined to the skin, that is, they do not project at right angles to the skin. Rectangular apertures are better suited for shaving these longer hairs, especially when their length amounts to at least 1.5 mm. The corners of the said apertures may also be radiused.

Figure 1:
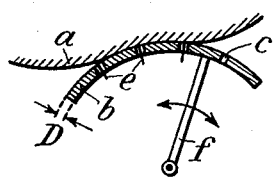
Fig. 1 is a diagrammatic transverse sectional view of the face-engaging part of the cutter head.
Figure 3:
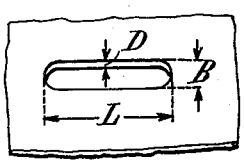
Fig. 3 is a greatly enlarged perspective view of part of the cutter head surface.
Figure 2:
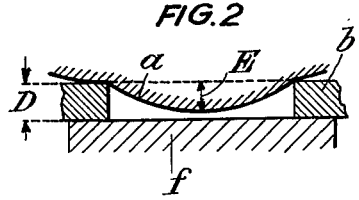
Fig. 2 is a greatly enlarged sectional view of part of the cutter head.
Figure 4:
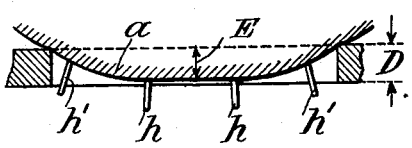
Fig. 4 is a greatly enlarged cross-sectional view axially of the apertures of Fig. 3.

It is customary for attaining a clean close-cut shave to fix the thickness D of the cutter-head portion which slides in the skin, and the width B and the length L of the apertures so that the skin enters the aperture just so far as not to be cut by the knife $f$ (Fig. 2). Such condition conventionally is fulfilled when, for example, a maximum width B of 0.25 mm. is used for a cutter-portion thickness D of 0.07 mm. Such combination has the disadvantage that the skin at the end portion of the aperture does not enter sufficiently far into the aperture, and has the proper depth of penetration only in the center of the aperture, that is, those hairs $h'$ which are immediately adjacent to the ends of the aperture are not cut sufficiently short. For this reason, a comparatively long time is required by a cutter head of such conventional construction for cutting all the hairs short, since always only the hairs $h$ are cut short, which latter hairs are cut in the center of the aperture. This, of course, applies only to apertures of a width prohibiting the skin from projecting from the center of the aperture, lest it be cut by the knife.

It is the main object of this invention to define shapes of apertures which eliminate the said disadvantages.

My invention is characterised by so changing at least one of the dimensions of the aperture, in at least part of the apertures, with respect to a rectangular aperture, the corners of which may be radiused, that at the aperture end-portions the skin can penetrate sufficiently far so as to permit a close shave, but to prevent the skin from projecting from the aperture in the center thereof. In other words: the aperture is so shaped that over its entire length the depth E of skin penetration never surpasses a definite value, which is attained close to the beginning of the aperture. Since such value at any certain point of the aperture is a function of the dimensions of the latter, the said dimensions have to be determined.

Tests have shown that, in the case of circular apertures, the skin enters the aperture approximately in the shape of a calotte or spherical segment. In the case of rectangular apertures, the skin enters in form of a circular arc as seen transversely of the longitudinal direction of the aperture, and approximately in form of an ellipse as seen in the said direction.

According to this invention the elongated apertures are so dimensioned that either the width B or the thickness D of the cutter-head portion which slides on the skin is made such as to let the skin immediately adjacent to the ends of the aperture enter the latter to a depth at which the skin just barely does not touch the knife and never enters thereinto any deeper over the entire length of the aperture. All the apertures of a cutter-head, or only part thereof, may be dimensioned as aforesaid.

The apertures in the cutter portion which slides on the skin and under which the knife moves, therefore, must be wide at its ends and narrow in the center or the said portion must be tapered in thickness at the said ends and thicker at the said center, or both these measures may be suitably combined.

A plurality of examples of cutter-head apertures dimensioned according to my present invention, are shown in the Figs. 5-8 of the accompanying drawing.

Figure 5:
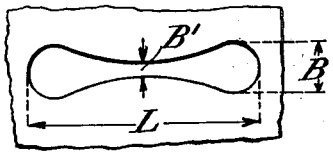

The elongated aperture shown in Fig. 5 has a length L and at its end portions a width B which permits the skin to bulge down to approximately the depth of the aperture. In order, however, that the skin, which, in the case of an aperture having a uniform width B at the center portion, would slightly project from the aperture into the range of the knife, is prevented from such projection, the width of the aperture in the said center portion is decreased to B'.

Figure 6:
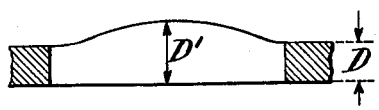

The same effect is attained if, as shown in Fig. 6, the depth D' of the aperture, or the thickness of the cutter portion, is made greater at the said center portion than the depth or thickness D in the end portions of the aperture.

Figure 7:
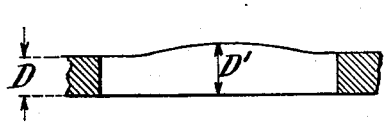
Figs. 6 and 7 are greatly enlarged sectional views through apertures of modified shape in the cutter head.
Figure 8:
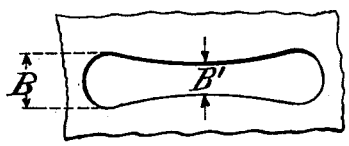
Figs. 5, 8 and 9 are plan views greatly enlarged showing apertures of different shapes in the cutter head.

In Figs. 7 and 8, the said two measures are combined, that is, the center portion of the aperture is made narrower (B') and deeper (D') than the end portions.

Figure 9:
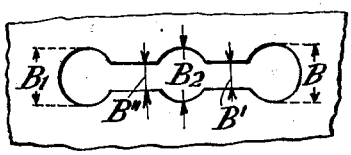
Figure 10:
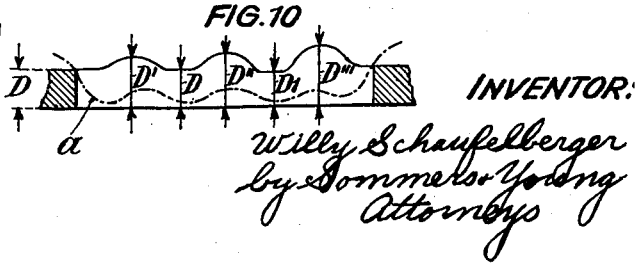
Fig. 10 is a sectional view through a modified shape of apertures in the cutter head.

Such reduction of the width of aperture or increasing of the depth thereof may be provided at various points along the aperture, for example as shown in Figs. 9 and 10.

In Fig. 9, the width B or $B_1$ of the end portions is narrowed down on one side to B", and on the other side to B', whereby B' and B" do not have to be equal. Intermediate to the two throats, there is an enlargement to $B_2$. More than two narrowed throats also may be provided for.

In Fig. 10, the depth D of the aperture is repeatedly increased, viz. at D', D" and D'''. The latter three values do not have to be equal, and the thickness of the end portion is again reached at one time, and another thickness, $D_1$, at another time. The cutter portion which slides on the skin may be thickened and thinned at still more places than shown in Fig. 10, within the range of an aperture, but such provision would not result in any substantial advantages.

The repeated narrowing of the aperture and the repeated deepening thereof also may be suitably combined with each other.

A widening $B_2$ which, from the point of view of depth of skin penetration, is excessive, also may be compensated by a correspondingly greater deepening of the aperture at this locality.

The present invention may be applied to cutter heads co-acting with rotary, oscillating, or reciprocating knives.

What I claim as new and desire to secure by Letters Patent, is:

1. A cutter head for dry-shavers comprising a stationary curved shearing plate for sliding on the skin, said shearing plate being provided with elongated apertures through which the hairs may pass, and a cutter blade having a cutting edge in contact with the under side of said shearing plate and movable substantially transversely to said elongated apertures, the cutting edge extending beyond both ends of said apertures so that the entire length of the apertures is swept by said edge, said apertures having at least one restricted portion intermediate the length thereof, the width of the restricted portion being at least 10% less than the width of the end portions of the apertures.

2. A cutter head for dry-shavers comprising a stationary curved shearing plate for sliding on the skin, said shearing plate being provided with elongated apertures through which the hairs may pass, and a cutter blade having a cutting edge in contact with the under side of said shearing plate and movable substantially transversely to said elongated apertures, the cutting edge extending beyond both ends of said apertures so that the entire length of the apertures is swept by said edge, said apertures having at least one restricted portion intermediate the length thereof, the width of the restricted portion being at least 10% less than the width of the end portions of the apertures, said shearing plate being provided with thickened portions coinciding with said restricted portions of the apertures in the plate, the thickness of said thickened portions being at least 10% greater than the thickness of the shearing plate at the end portion of the apertures.

WILLY SCHAUFELBERGER.

REFERENCES CITED

The following references are of record in the file of this patent:

UNITED STATES PATENTS

| Number | Name | Date |
| --- | --- | --- |
| 2,240,633 | Testi | May 6, 1941 |
| 2,286,443 | Scully | June 16, 1942 |
| 2,325,606 | Hanley | Aug. 3, 1943 |
| 2,331,274 | Martin | Oct. 5, 1943 |